US012679056B2

(12) United States Patent
Pintz et al.

(10) Patent No.: US 12,679,056 B2
(45) Date of Patent: Jul. 14, 2026

(54) SYSTEM AND METHOD FOR LOW-STRESS OPTICAL LENS USING A 3D-PRINT CORRECTION TECHNIQUE

(71) Applicant: Meta Platforms Technologies, LLC, Menlo Park, CA (US)

(72) Inventors: Sandro Pintz, Menlo Park, CA (US); Kurt Jenkins, Sammamish, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 954 days.

(21) Appl. No.: 17/956,305

(22) Filed: Sep. 29, 2022

(65) Prior Publication Data

US 2023/0271392 A1      Aug. 31, 2023

Related U.S. Application Data

(60) Provisional application No. 63/315,020, filed on Feb. 28, 2022.

(51) Int. Cl.

| | |
|---|---|
| *B29D 11/00* | (2006.01) |
| *B29C 64/112* | (2017.01) |
| *B29C 64/393* | (2017.01) |
| *B33Y 10/00* | (2015.01) |
| *B33Y 80/00* | (2015.01) |
| *G01M 11/02* | (2006.01) |
| *G02B 1/04* | (2006.01) |
| *G02B 3/02* | (2006.01) |

(Continued)

(52) U.S. Cl.
CPC ...... *B29D 11/00432* (2013.01); *B29C 64/112* (2017.08); *B29C 64/393* (2017.08); *B29D 11/0098* (2013.01); *B33Y 10/00* (2014.12);

*B33Y 80/00* (2014.12); *G01M 11/025* (2013.01); *G02B 1/041* (2013.01); *G02B 3/02* (2013.01); *B29L 2011/0016* (2013.01); *G02B 2003/0093* (2013.01)

(58) Field of Classification Search
CPC .......... B29D 11/00432; B29D 11/0098; B29D 11/00009; B29D 11/00961; B29C 64/112; B29C 64/393; B29C 64/209; B29C 64/245; B29C 64/386; B33Y 10/00; B33Y 80/00; B33Y 30/00; B33Y 50/00; G01M 11/025; G02B 1/041; G02B 3/02; G02B 2003/0093; B29L 2011/0016
See application file for complete search history.

(56) References Cited

U.S. PATENT DOCUMENTS

2016/0161761 A1 *   6/2016   Quere .............. B29D 11/00009 427/164

* cited by examiner

*Primary Examiner* — James C. Jones
(74) *Attorney, Agent, or Firm* — Greenberg Traurig, LLP

(57) ABSTRACT

A corrected optical lens includes an inner layer that includes a low stress optical lens and an outer layer that includes one or more corrective layers. The outer layer may be formed on at least a portion of an outer surface of the inner layer by scanning the outer surface of the inner layer, generating a surface characterization file based on the outer surface scan, and 3D printing the one or more corrective layers on the outer surface of the inner layer based on the surface characterization file as input to a 3D printer. The surface characterization file may be corrected based on a particular predetermined contour of the inner layer prior to being input to the 3D printer. The correction may include, for example, reduction of root mean square (RMS) values of deviations of detected peaks and valleys on the surface of the inner layer.

20 Claims, 11 Drawing Sheets

100

DOUBLE CONVEX    PLANO-CONVEX    CONVERGING MENISCUS 102            104            106

CONVERGING LENSES

DOUBLE CONCAVE    PLANO-CONCAVE    DIVERGING MENISCUS 108            110            112

DIVERGING LENSES

(51) Int. Cl.
    *B29L 11/00*          (2006.01)
    *G02B 3/00*           (2006.01)

800

FORM INNER LAYER OF OPTICAL LENS
802

CHARACTERIZE OUTER SURFACE OF INNER LAYER
804

CORRECT SHAPE OF CHARACTERIZATION
806

GENERATE MODEL FROM CORRECTED CHARACTERIZATION
808

3D PRINT (LAYER-BY-LAYER) OUTER LAYER ON OUTER SURFACE OF INNER LAYER
810

SYSTEM AND METHOD FOR LOW-STRESS OPTICAL LENS USING A 3D-PRINT CORRECTION TECHNIQUE

CROSS REFERENCE TO RELATED APPLICATIONS

This patent application claims the benefit of U.S. Provisional Patent Application Ser. No. 63/315,020 filed on Feb. 28, 2022. The disclosures of the above application are hereby incorporated by reference for all purposes.

TECHNICAL FIELD

This patent application relates generally to optical lenses, and more specifically, to systems and methods for manufacturing accurate and low stress optical lenses through a 3D overprinting technique to correct or augment surface imperfections.

BACKGROUND

Optical lenses have a wide range of implementations from astronomy to microscopy. With recent advances in technology, use of optical lenses in increasingly smaller shape cameras and virtual reality (VR) display systems such as head-mount displays, glasses, etc. have proliferated. While larger optical lenses tend to be manufactured in smaller numbers with individual attention, mass-manufacturing of smaller, yet accurate and reliable optical lenses is a challenging endeavor.

Traditional methods such as molding or casting may be used in manufacturing smaller optical lenses in large quantities, but accuracy of these lenses may tend to suffer if optical lenses are produced with low stress focus. On the other hand, optical lenses created with a focus on accuracy may tend to have greater material stress, which may cause higher failure rates especially during mass-production.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

DETAILED DESCRIPTION

Figure 1:
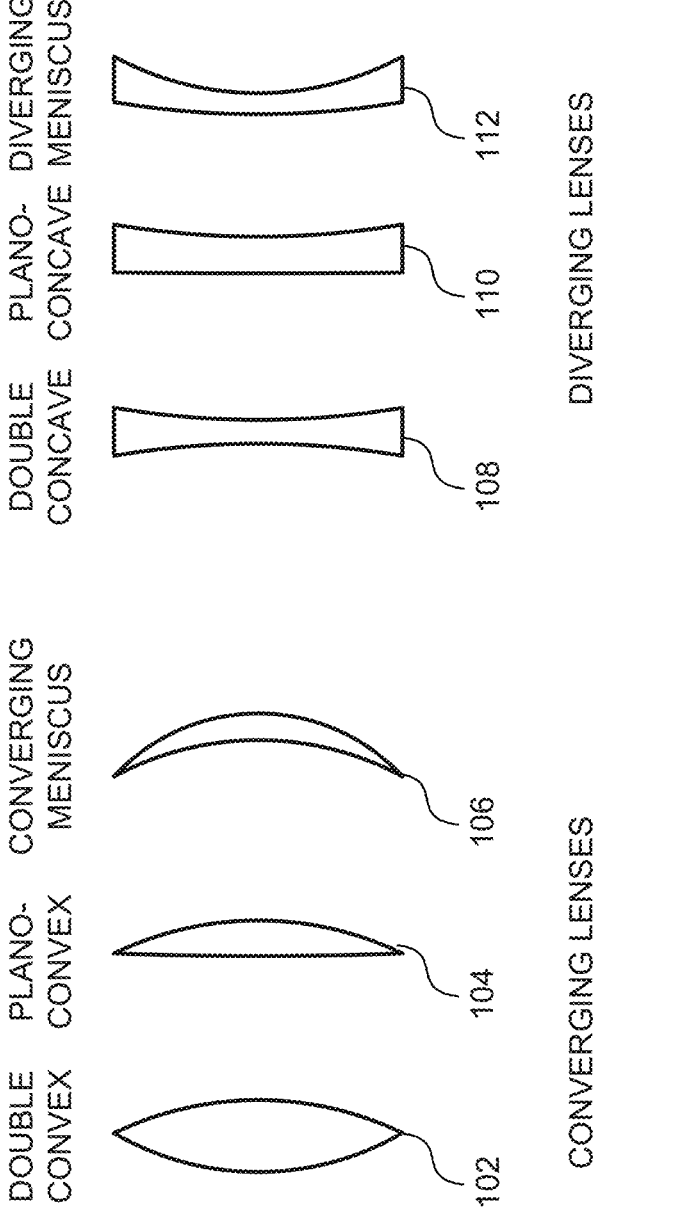
FIG. 1 illustrates different types of optical lenses that may be formed through 3D overprinting for correction, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

Optical lenses may be made from any number of materials, such as glass, polymers, etc. They may also be made using any number of techniques, such as molding, casting, etc. For many types of optical lenses, accuracy is an important characteristic. Accuracy, as used herein, may refer to conformance of a lens surface to have a particular predetermined contour. However, during manufacturing of the optical lens, specifically at the end stage when either glass is cooled or polymers are cured, material properties of an optical lens may undergo any number of small changes, e.g., due to structural relaxation or other effects. When this occurs, residual stresses may be trapped inside the molded optical lenses, whether it is made of glass, polymer, or other similar material. This residual stress inside the optical lenses may contribute to one or more adverse effects, such as refractive index variation, which may result in unwanted light path as well as intensity variation that may lead to image quality deterioration. Moreover these adverse effects may be exacerbated when further attempting to control form error or to manage low stress together when molding or casting, especially in optical lenses that are in excess of 4 mm in thickness.

Disclosed herein are systems, apparatuses, and methods that may provide low stress and accuracy in optical lens manufacturing. The systems, apparatuses, and methods described herein may provide a 3D overprinting technique that provides a thin outer layer that corrects or augments surface imperfections of a low stress inner layer of the optical lens. In some examples, the inner layer may be an optical lens that is produced (e.g., mass produced) through casting, molding, or similar methods or techniques. In this way, the inner layer may be created with reduced residual stress. Although there may be imperfections on an outer surface of the inner layer, the 3D overprinting technique may provide an efficient, cost-efficient way to resolve this and improve accuracy of the optical lens.

In some examples, the outer surface of the inner layer of the optical lens may be scanned using a 3D scanner employing visible, infrared, or laser light to generate a model. The model may be a data file representation of the scanned surface. In some examples, the data file (or model) may be used as a build blueprint by a 3D printer, and the 3D printer may incorporate corrections to surface imperfections of the inner layer of the optical lens (e.g., through an additional input of a particular predetermined contour for the optical lens). In other examples, the corrections may be made to the data file, and the corrected data file may be used as build blueprint input for the 3D printer. In some examples, inkjet type layer-by-layer 3D printing may be used to generate sub-micrometer-level corrective layers on the surface of the inner layer. In some examples, digital light processing (DLP) 3D printing, micro-projection stereolithography (SLA) printing, or comparable techniques may also be employed.

In some examples, a scanned surface characterization of the inner layer of the optical lens may be used as direct input to a 3D printer along with the particular predetermined contour of the optical lens. Because the corrective layers printed onto the inner layer are relatively thin, an overall print time may be relatively short. Furthermore, scanning and 3D printing may treat all lenses in a mass-production line individually increasing a production yield. Other benefits and advantages may also be apparent.

FIG. 1 illustrates different types of optical lenses that may be formed through 3D overprinting for correction, according to an example. As used herein, a "lens" or an "optical lens" may refer to any transmissive optical device made from plastic, polycarbonates, or similar materials using molding, casting, 3D printing, and similar techniques. As used herein, "3D" may refer to three-dimensional in context of scanning and/or printing contrasted with two-dimensional, planar scanning or printing, where three-dimensional features of an object can be detected or created. As used herein a "PV" may refer to peak-to-valley ratio, which is a metric used to characterize deviations of 3D features of an object from a common plane of the object. As used herein a "RMS" may refer to root mean square average, which is another metric used to characterize deviations of 3D features of an object from a common plane of the object.

As shown in diagram 100 of FIG. 1, example optical lens types may include, but are not limited to double convex lens 102, plano-convex lens 104, converging meniscus lens 106, double concave lens 108, plano-concave lens 110, and diverging meniscus lens 112. The double convex lens 102, the plano-convex lens 104, and the converging meniscus lens 106 may be categorized as converging lenses. The double concave lens 108, the plano-concave lens 110, and the diverging meniscus lens 112 may be categorized as diverging lenses.

An optical lens is a transmissive optical device which focuses or disperses a light beam by means of refraction. A simple optical lens consists of a single piece of transparent material, while a compound optical lens consists of several simple lenses (elements), usually arranged along a common axis. Optical lenses are made from materials such as glass or plastic (e.g., monomers, polymers, polycarbonates), and are ground and polished or molded to a particular predetermined shape. An optical lens can focus light to form an image. Optical lenses do not form perfect images, and a lens always introduces some degree of distortion or aberration that makes the image an imperfect replica of the object. Careful design and production of the lens for a particular application may minimize the aberration.

Figure 2:
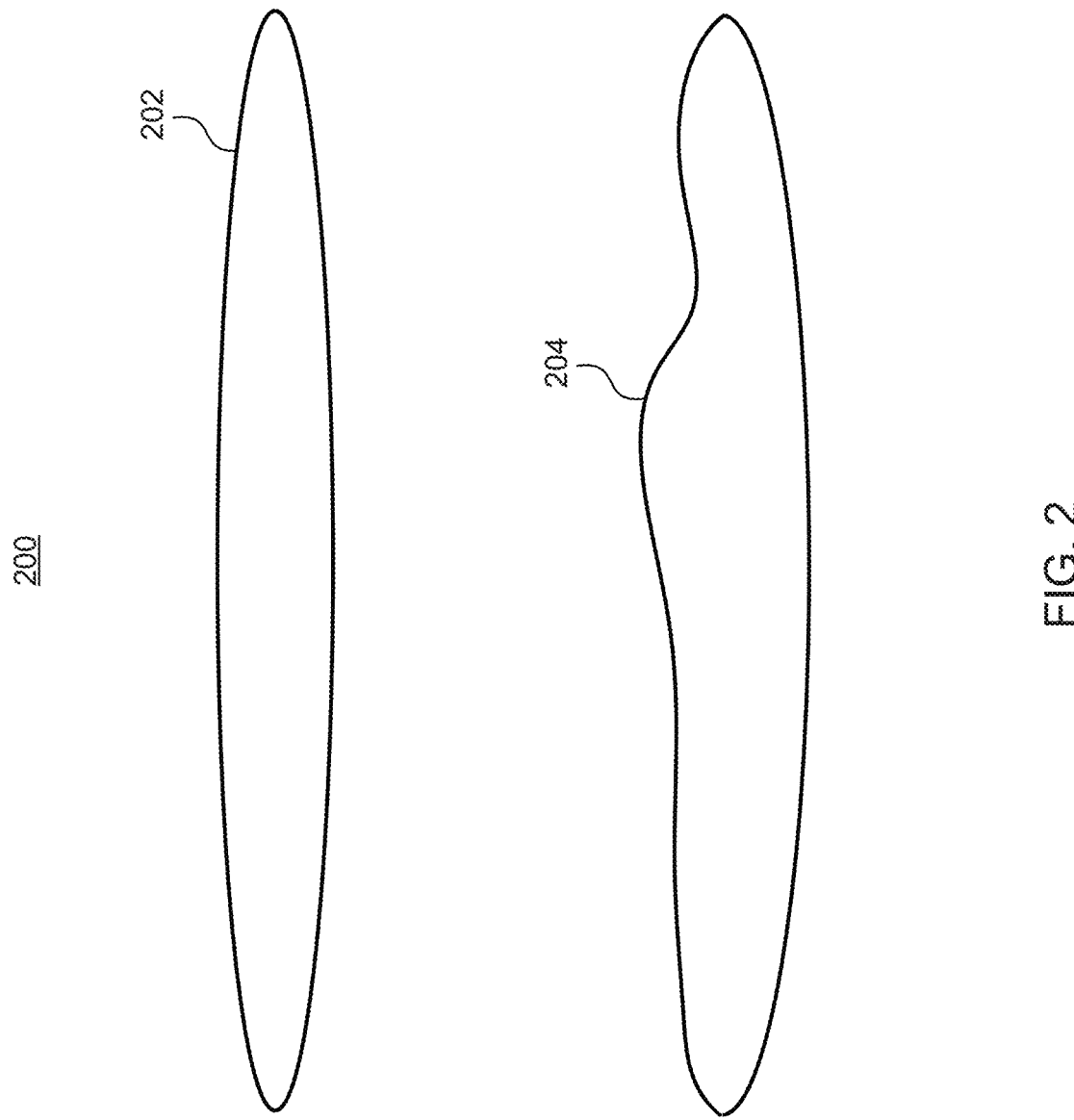
FIG. 2 illustrates a comparison of lateral cross-sections of an ideal convex lens and an imperfect convex lens, according to an example.

FIG. 2 illustrates a comparison of lateral cross-sections of an ideal convex lens and an imperfect convex lens, according to an example. Diagram 200 in FIG. 2 shows an ideal convex lens 202, where an outer surface of the optical lens has a smooth contour matching a particular predetermined shape for the lens, and an imperfect convex lens 204, where the outer surface may include peaks and valleys that may form due to residual stresses during cooling or curing phases of production. The imperfect convex lens 204 is shown in the diagram with exaggerated features for illustration purposes. In practice the peaks and valleys may deviate from the ideal contour in a range from a few micrometers to about 100 micrometers.

As mentioned herein, optical lenses may be manufactured using casting, molding, or even compression molding, the latter being a relatively recent technique that allows higher accuracy. However, during cooling or curing, glass or plastic properties may undergo small changes due to structural relaxation resulting in residual stresses being trapped inside the molded optical lenses. Residual stresses inside the optical lenses may contribute to refractive index variation and result in unwanted light path as well as intensity variation that may cause image quality deterioration. Controlling the form accuracy and simultaneously managing low stress in optical lenses in excess of 4 mm in thickness can, thus, be challenging.

Figure 3:
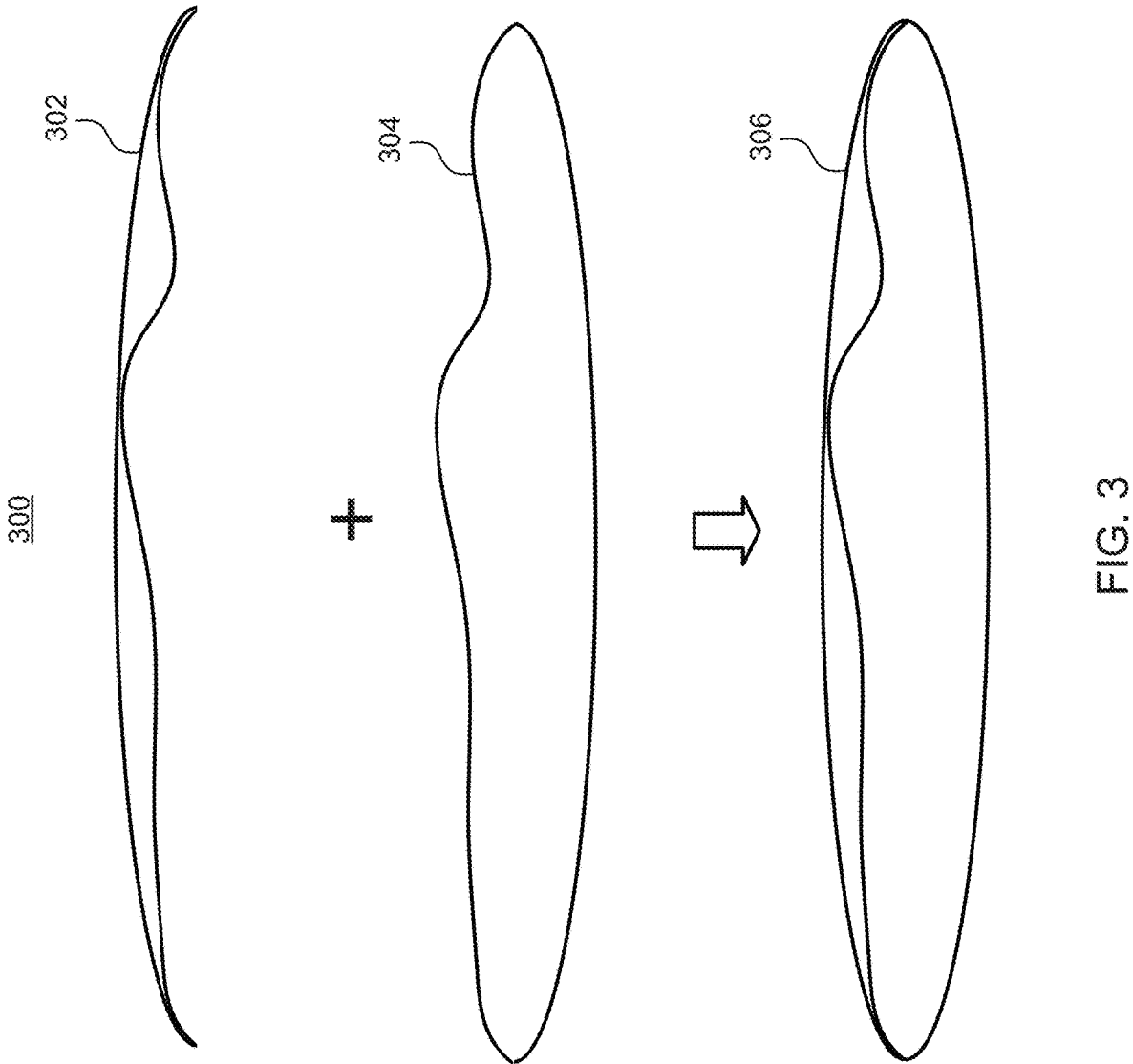
FIG. 3 illustrates how an imperfect convex lens can be corrected or augmented by 3D overprinting an outer layer over the imperfect convex lens, according to an example.

FIG. 3 illustrates how an imperfect convex lens can be corrected or augmented by 3D overprinting an outer layer over the imperfect lens, according to an example. Diagram 300 in FIG. 3 shows an inner layer 304 of a low stress optical lens combined with a thin, 3D printed, outer layer 302 resulting in a more accurate, corrected lens 306. As in FIG. 2, certain features such as peaks and valleys of the inner layer 304 and the outer layer 302 are shown in exaggerated form for illustration purposes.

In some examples, inner layer 304 may be manufactured using casting, injection molding, compression molding, machining, and polishing, or similar suitable methods. Materials for the inner layer 304 may include any suitable optical material, but are not limited to, glass, optical grade plastics such as poly-methyl-methacrylate (PMMA), cyclic-olefin-copolymer (COC), cyclo-olefin-polymer (COP), monomer plastic, polymer plastic, polycarbonate (PC), optical nylon, etc. Because the inner layer 304 is the thicker, main portion of the corrected lens, low stress techniques such as compression, slow cooling, slow cure, etc. may be applied to reduce residual stresses in the inner layer 304. Residual stresses may also cause birefringence, which is the phenomenon exhibited by certain materials in which an incident ray of light is split into two rays, called an ordinary ray and an extraordinary ray. The ordinary ray and the extraordinary ray may be plane-(linear) polarized in mutually orthogonal planes or circular-polarized in opposite directions. In the diagram, only upper surface is shown with imperfections, but both upper and lower surfaces may include such imperfections.

In some examples, the outer layer 302, which is relatively thinner compared to the inner layer 304 may be formed through 3D printing over the inner layer 304. To form the corrected lens, a surface of the inner layer 304 may be scanned and analyzed, a model generated based on the analysis, the model corrected based on a particular predetermined contour of the corrected lens, and the outer layer 302 printed over the inner layer 304 of the optical lens layer-by-layer. The outer layer 302 may range in thickness from about 25 micrometers to about 100 micrometers in practical implementations. Thus, the 3D printing process may be a fast one. Each of the corrective layers may range in thickness from less than 1 micrometer to about 10 micrometers. Thus, the outer layer 302 may not be susceptible to residual stresses. As the inner layer 304 is formed addressing residual stresses, the corrected lens may be low stress and accurate as a result of the 3D corrective overprinting.

Figure 4A:
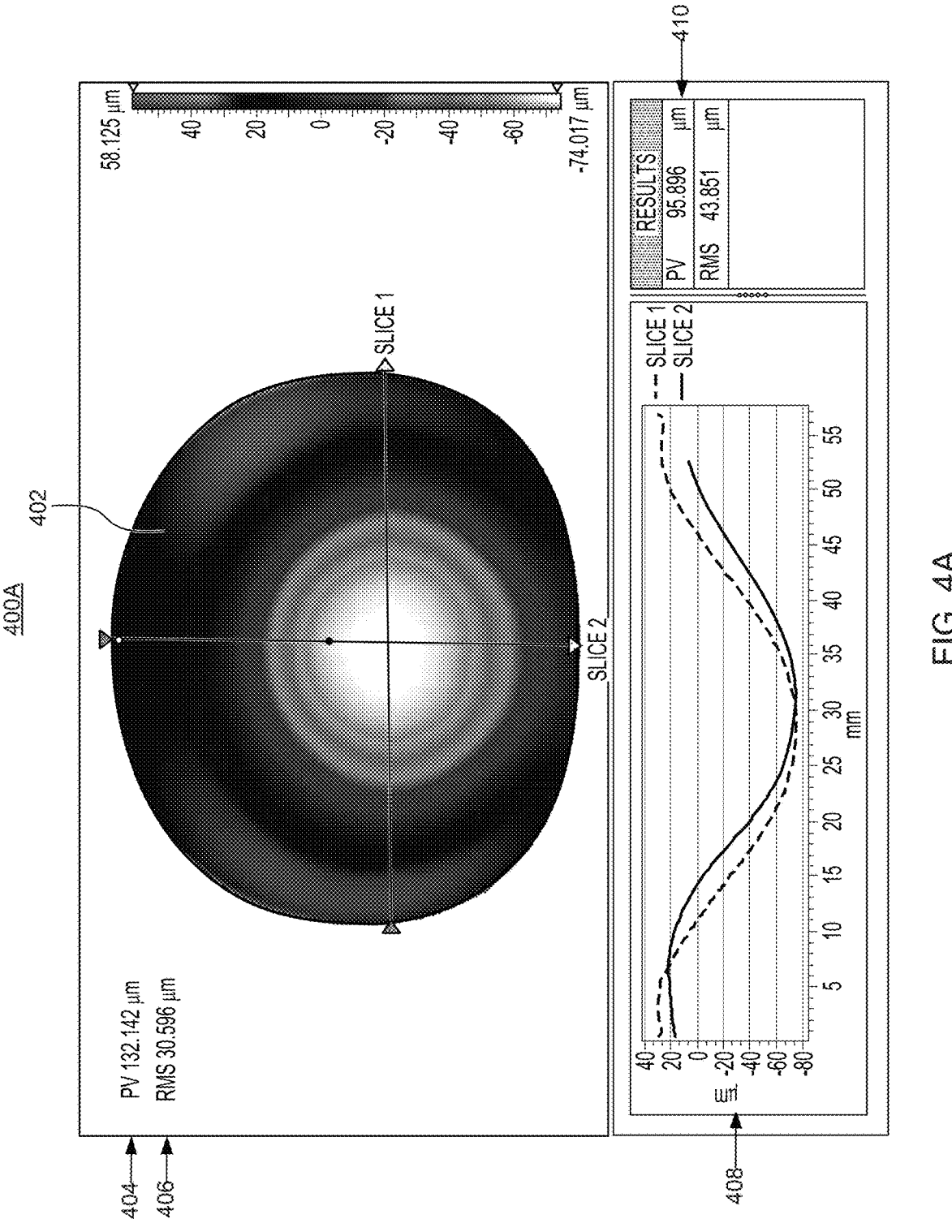
FIG. 4A illustrates a surface scan of an imperfect optical lens (inner layer) to build a surface model, according to an example.

FIG. 4A illustrates a surface scan of an imperfect optical lens (inner layer) to build a surface model, according to an example. Diagram 400A in FIG. 4A shows a color-coded surface scan of an example optical lens 402. The surface is scanned slice-by-slice. A plot 408 of two example slices is also shown. Diagram 400A further includes a listing 410 of overall peak-to-valley (PV) ratio and root mean square (RMS) average of peaks and valleys with reference to the surface of the optical lens. On the image of the surface scan a PV 404 and RMS 406 of a currently displayed slice is also shown.

In some examples, the surface scan may be performed using visible light, infrared light, or a laser light (visible or otherwise). Depending on the size of the optical lenses, multiple lenses (e.g., in case of small lenses, hundreds) may be scanned on a template. For example, a high-volume, high-speed non-contact profilometer system or comparable 3D scanners may be used to measure geometric lens features. Optical surface and geometrical features such as interlock surface roundness, flatness of the flat lens surface (peaks and valleys), and location of the optical surface relative to these features may be characterized by the system. Other features that may be characterized may include, but are not limited to, surface figure error, peak-to-valley (PV) measurements, and similar ones.

A surface characterization file may be generated from the scan that includes deviation of peaks and valleys from the particular predetermined contour surface. In some examples, the surface characterization file may be used as direct input to a 3D printer, where the printer may be programmed to compensate for the deviations, effectively generating a corrected model from the surface characterization file and printing based on the corrected model. In other examples, the surface characterization file may be used to generate the corrected model separately, and the corrected model fed into the 3D printer. In yet other examples, the scanner and the printer may be integrated such that scanning, analyzing, and printing may be performed together in real time.

Figure 4B:
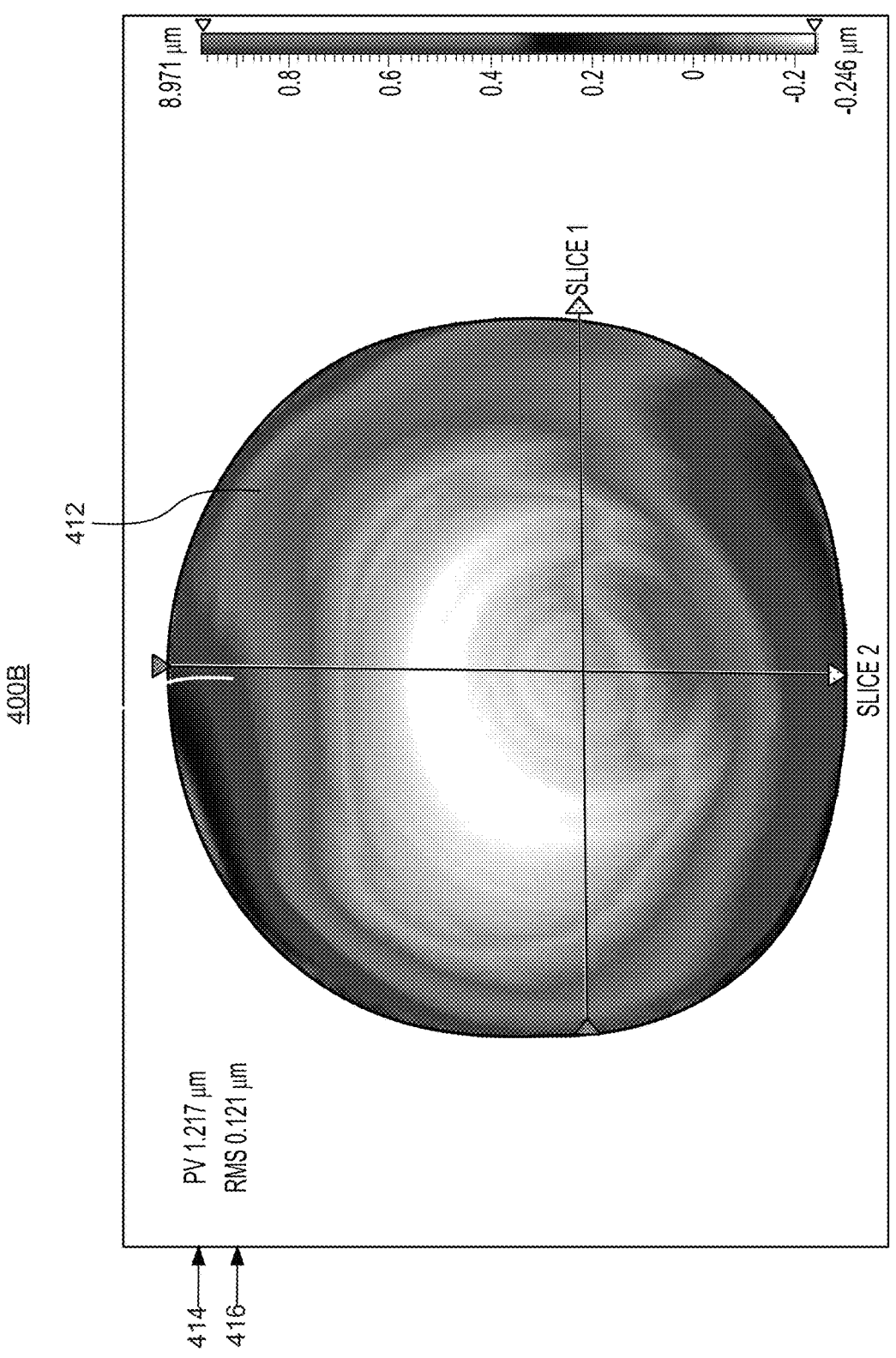
FIG. 4B illustrates a corrected surface scan of the imperfect optical lens (inner layer) of FIG. 4A, according to an example.

FIG. 4B illustrates a corrected surface scan of the imperfect optical lens (inner layer) of FIG. 4A, according to an example. Diagram 400B in FIG. 4B shows a color-coded corrected model for the example optical lens 412. As the color change indicates, deviations may be substantially reduced through the correction resulting in higher accuracy for the optical lens. Example PV 414 and RMS 416 values also show substantial reduction from the corresponding original PV 404 and RMS 406 values of the original optical lens in diagram 400A.

In some examples, every optical lens in a mass production template may be corrected uniquely. Thus, manufacturing density may be increased (i.e., higher number of lenses produced in smaller space). The example RMS 406 value in diagram 400A is about 30 micrometers, whereas an RMS value of less than 5 micrometers may be desirable for high accuracy. The example RMS 416 value of 0.121 micrometers in diagram 400B shows the improvement, which is an indication of how much accuracy can be enhanced. In practical implementations, a yield of about 70-80% in mass production using standard casting or molding methods may be improved to above 95% using the example 3D corrective overprinting approach.

In some examples, a hologram scanner may be used to characterize the inner layer's surface features. Hologram scanner may be arranged to measure the deviations, compute necessary correction based on the particular predetermined contour of the optical lens, and create a build file for the 3D printer. The hologram scanner may be separate from or integrated with the 3D printer.

Figure 5:
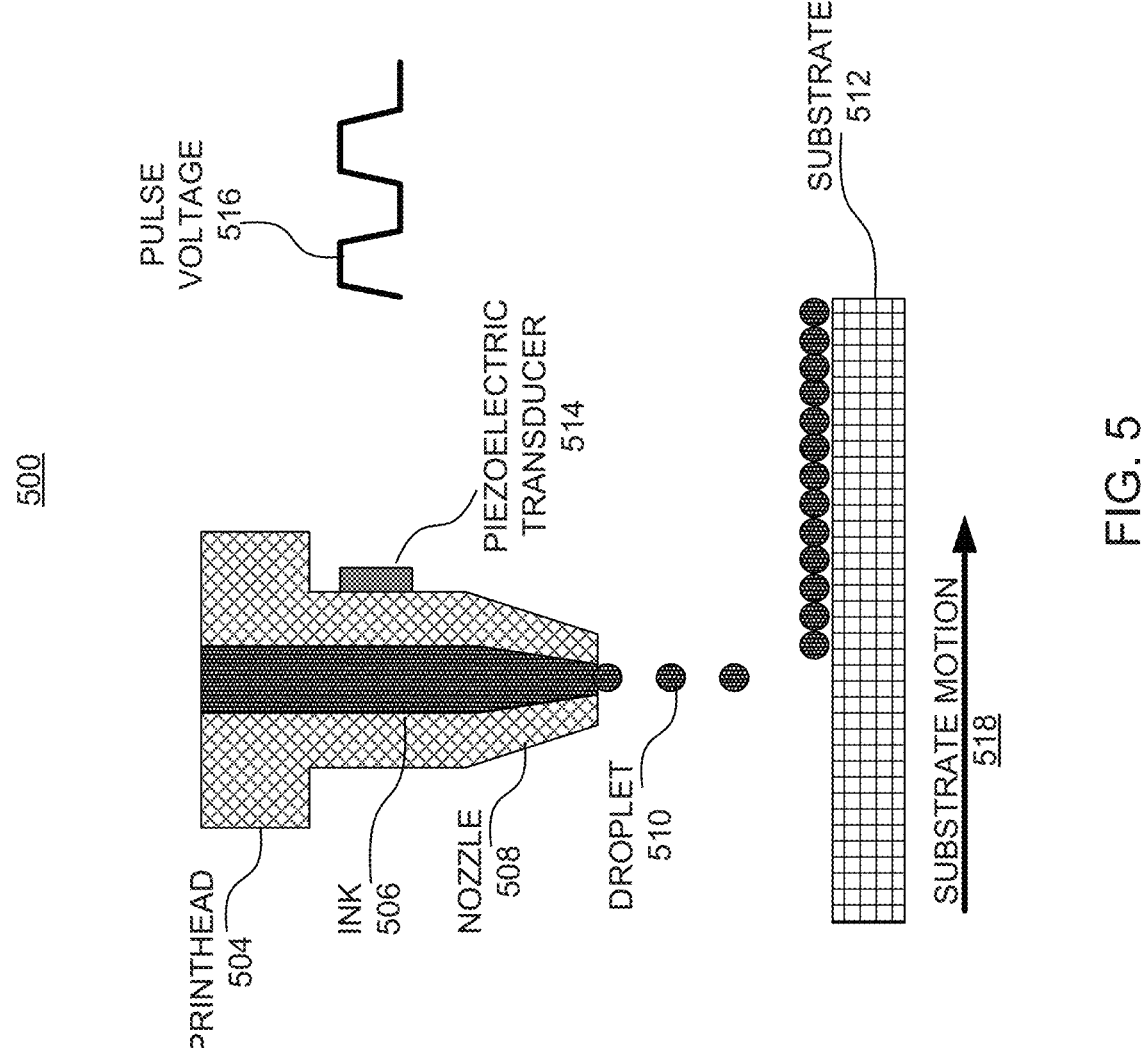
FIG. 5 illustrates layer-based printing by an inkjet 3D printer nozzle, according to an example.

FIG. 5 illustrates layer-based printing by an inkjet 3D printer nozzle, according to an example. Diagram 500 in FIG. 5 shows a nozzle 508 of an inkjet type 3D printhead 504, where ink 506 (print material such as polymer or polycarbonate) is liquified and flows through the nozzle 508. The flowing print material drops onto a substrate 512 as droplets 510. The substrate may be moved 518 linearly or planarly as the droplets 510 fall allowing a layer of print material with a thickness of one droplet to be formed on the substrate 512. A piezoelectric transducer 514 actuated by a pulse voltage 516 may generate a pressure pulse causing the droplets 510 to be ejected by the nozzle 508. Coordination between the electronics of the 3D printer and the motion system may enable digital patterning of complex layouts on planar surfaces such as the outer layer on an inner layer of the optical lens.

In some examples, the print material (ink 506) may be liquified prior to being provided to the nozzle 508 and cured (e.g., through photo-curing or cooling) on the substrate. In other examples, the print material may be liquified inside the nozzle by applying heat. In an example 3D printer for corrective overprinting of optical lenses, picoliter size droplets may be ejected by the nozzle 508 resulting in a corrective layer thickness ranging from sub-micrometers to 10 micrometers. In some examples, the outer layer may be formed by using photo-cured polymers. While the corrected lens (including the inner layer and the outer layer) may be 3D printed as a single piece, due to the overall thickness, print times may be too slow for mass production, whereas relatively thin outer layers may be printed relatively rapidly allowing high yield mass production of optical lenses.

Figure 6A:
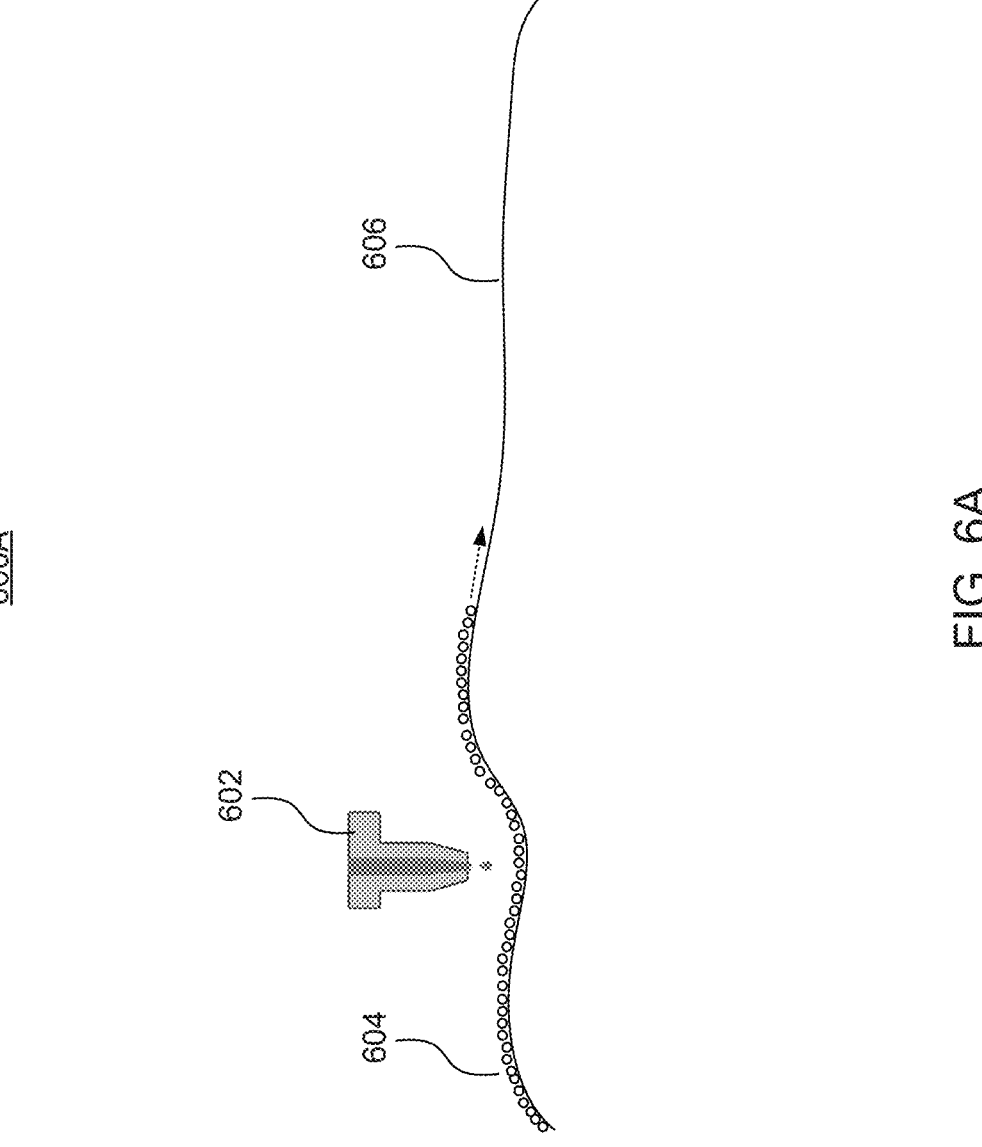
FIGS. 6A through 6C illustrate various stages of layer-based 3D printing to correct or augment surface imperfections of an optical lens, according to an example.
Figure 6B:
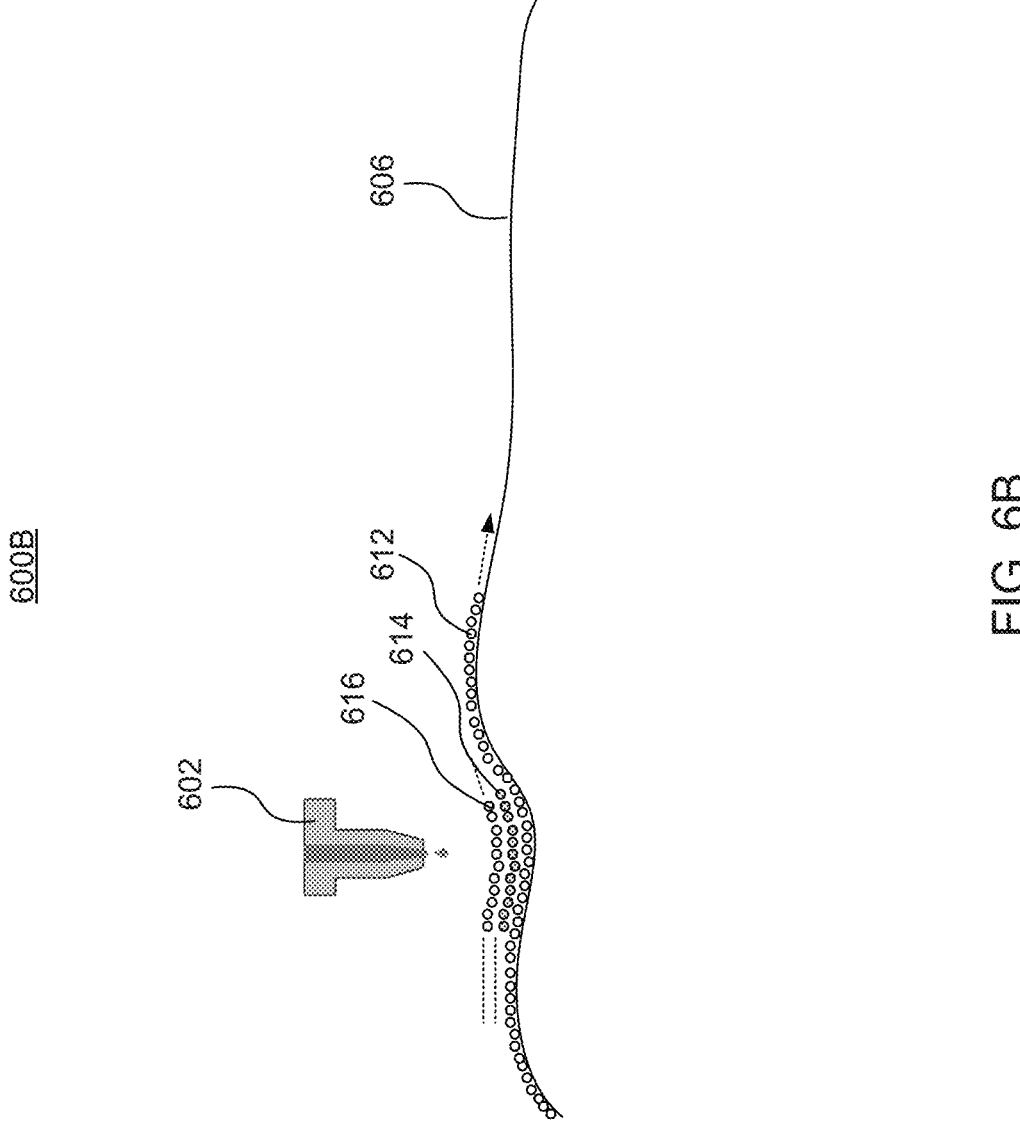
Figure 6C:
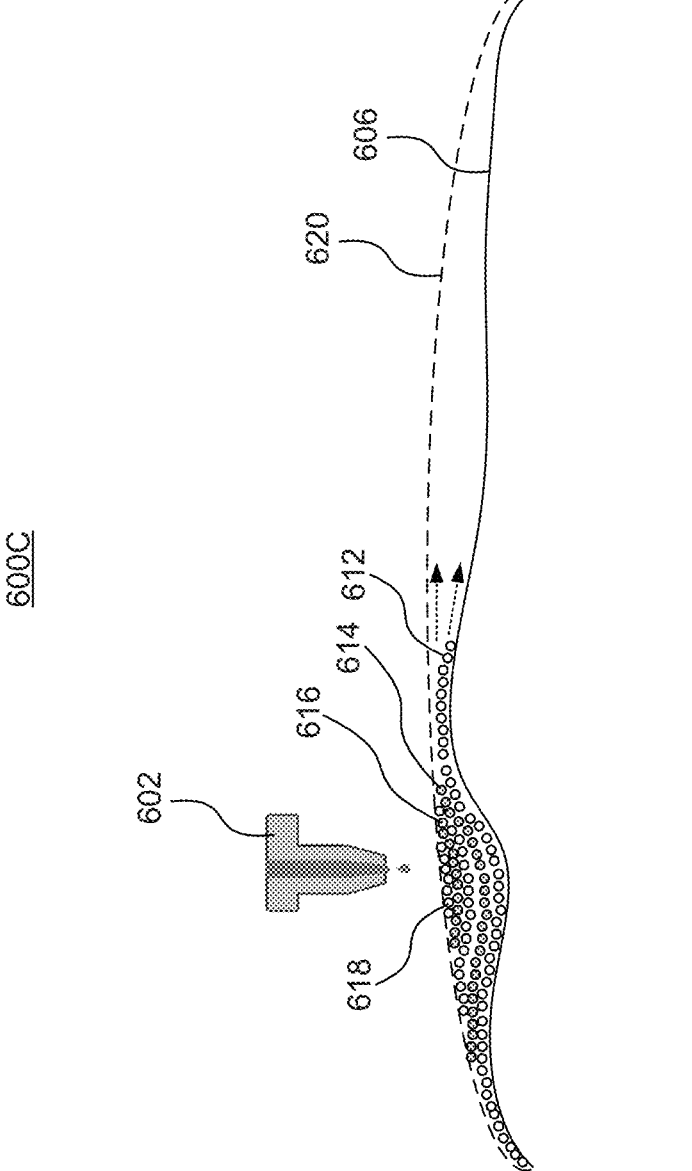

FIGS. 6A through 6C illustrate various stages of layer-based 3D printing to correct or augment surface imperfections of an optical lens, according to an example. Diagram 600A in FIG. 6A shows a 3D printer nozzle 602 printing a first corrective layer 604 on a surface 606 of an inner layer of the optical lens. Diagram 600B in FIG. 6B shows the 3D printer nozzle 602 printing two successive corrective layers 614 and 616 over the first corrective layer 612 on the surface 606 of an inner layer of the optical lens. Diagram 600C in FIG. 6C shows the 3D printer nozzle 602 printing successive corrective layers 614, 616, and 618 over the first corrective layer 612 on the surface 606 of an inner layer of the optical lens to achieve a correctly contoured surface 620 for the corrected lens.

In some examples, each corrective layer may have a thickness in a range from sub-micrometers to about 10 micrometers. Thus, residual stresses may not be generated during curing of the corrective layers. Corrective layers may be formed using the same material as the inner layer or a suitable different material (with matching refraction index). A size of the droplets (thereby a thickness of the corrective layer) may be selected based on an overall thickness of the optical lens and/or a thickness of the overall outer layer.

In some examples, gaps may be left in each successive corrective layer to compensate for peaks on the surface of the inner layer of the optical lens, whereas the successive corrective layers themselves compensate for the valleys on the surface of the inner layer of the optical lens. The corrective layers may be formed such that an overall contour of the formed outer layer matches a particular predetermined contour of the corrected lens (i.e., lens prescription).

In some examples, other parts such as relatively flat form electronics may be added between the layers. In such scenarios, the printing may be halted, the part added, and printing continued to cover the part. As mentioned herein, 3D printing a thin outer layer on top of an inner layer of the optical lens may allow for metrology of the inner surface to be taken and characterized. The surface data may generate a compensated surface file to transform the inner layer of the optical lens into a nominal condition. The 3D surface file from the metrology step may then be provided to the 3D printer, where the actual build layers for the print may be applied to the part in real time.

Figure 7:
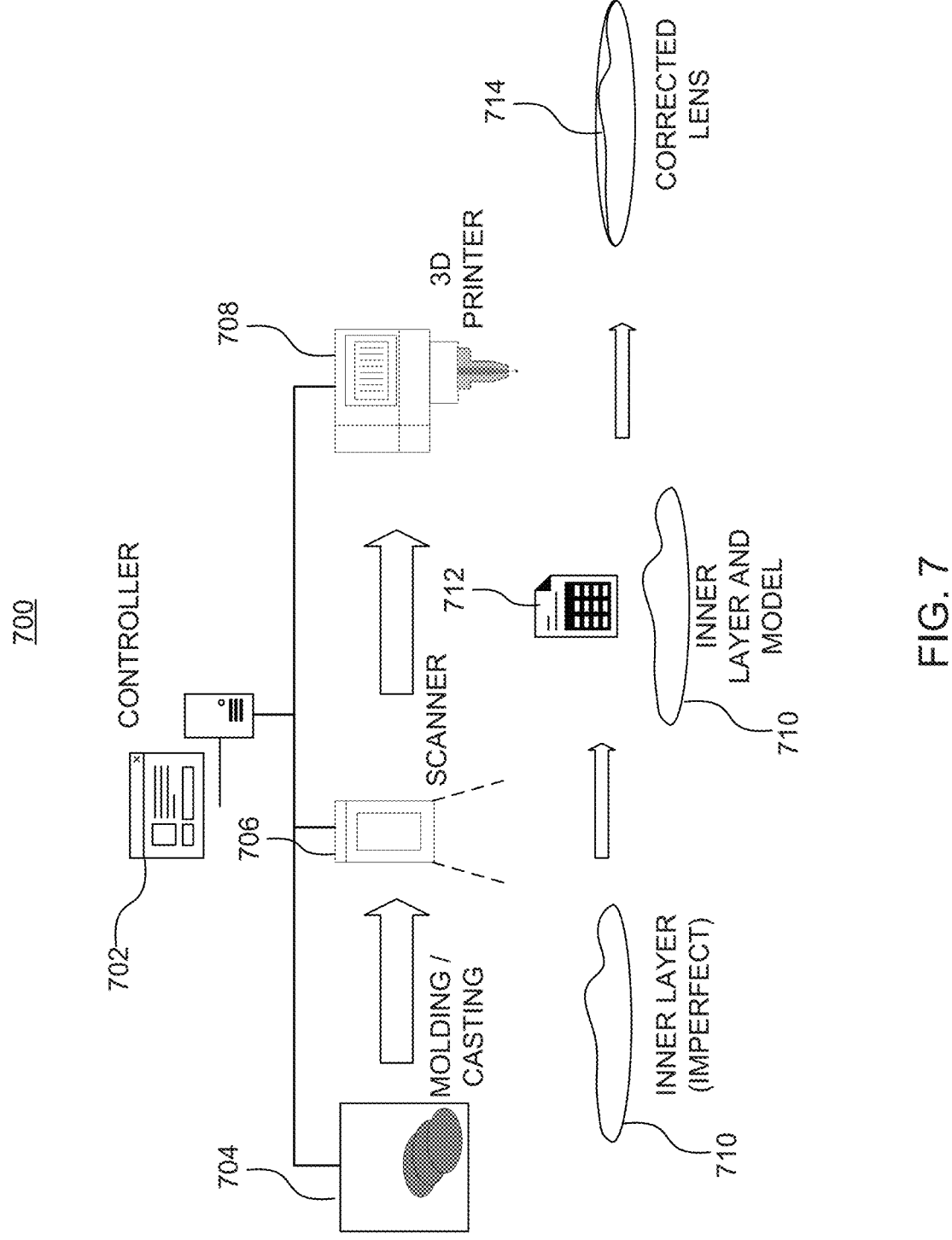
FIG. 7 illustrates a system for manufacturing optical lenses with 3D corrective overprinting, according to an example.

FIG. 7 illustrates a system for manufacturing optical lenses with 3D corrective overprinting, according to an example. Optical lens manufacturing system 700 includes a controller 702, a lens generator 704 (e.g., a molding machine or a casting machine), a 3D scanner 706, and a 3D printer 708. As shown in the optical lens manufacturing system 700, an inner layer 710 may be provided from the lens generator 704 to the 3D scanner 706; the inner layer 710 and a model 712 based on surface scan may be provided; and corrected lens 714 may be provided as output of the 3D printer 708.

In some examples, an inner layer 710 may be formed through injection molding, machine casting, compression molding, or similar methods at the lens generator 704. As discussed herein, the inner layer 710 may be formed employing residual stress reducing measures. Thus, the inner layer 710 may have surface imperfections such as peaks and valleys that may reduce its accuracy. The 3D scanner 706 may scan surface(s) of the inner layer 710 generating a model (or surface characterization file) 712. The model 712 may be corrected based on a particular predetermined contour of the optical lens at the controller 702, 3D scanner 706, or 3D printer 708. The corrected model may then be used by the 3D printer to overprint an outer layer onto the inner layer 710 forming the corrected lens 714.

In some examples, the controller 702 may be communicatively coupled through wired or wireless media to the lens generator 704, 3D scanner 706, and/or 3D printer 708, and control part or all of their operations. For example, the controller 702 may store machine-readable instructions on a non-transitory computer readable medium and execute through a processor or other type of processing circuit to perform one or more operations described herein.

In some examples, the controller 702, the lens generator 704, the 3D scanner 706, and the 3D printer 708 may be distinct devices or systems that are communicatively coupled. In other examples, the devices or systems may be partially or wholly integrated. A system for manufacturing optical lenses with 3D corrective overprinting may include additional or fewer components with performing additional or similar functionality as described components.

Figure 8:
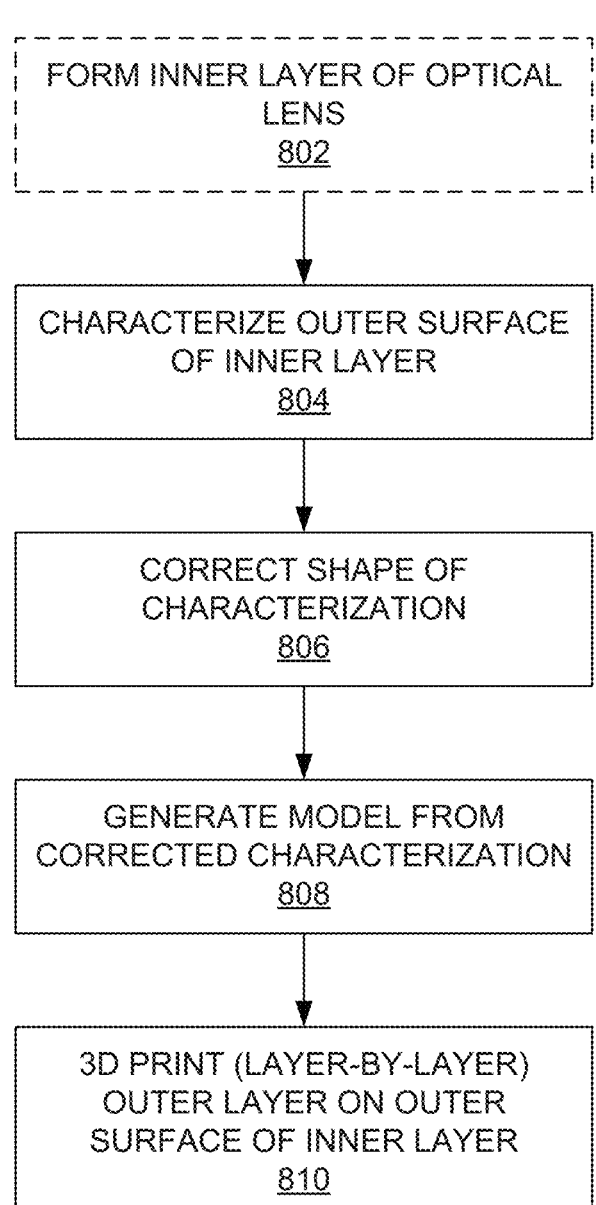
FIG. 8 illustrates a flowchart of a method to employ 3D overprinting in correction of optical lens surfaces, according to an example.

FIG. 8 illustrates a flowchart of a method to employ 3D overprinting in correction of optical lens surfaces, according to an example. Although the method 800 is primarily described as being performed by optical lens manufacturing system 700 that includes a lens generator 704 (e.g., casting machine or injection molding machine), a 3D scanner 706, and a 3D printer 708, the method 800 may be executed or otherwise performed by other systems, or a combination of systems. Each block shown in FIG. 8 may further represent one or more processes, methods, or subroutines, and one or more of the blocks may include machine-readable instructions stored on a non-transitory computer readable medium and executed by a processor or other type of processing circuit to perform one or more operations described herein.

At optional block 802, the lens generator 704 may form an inner layer 710 through injection molding, machine casting, compression molding, or similar methods. In a mass production environment, the lens generator may form numerous optical lenses. Block 802 is optional because, in some examples, the 3D corrective overprinting process may take existing optical lenses and scan, analyze, overprint to form more accurate optical lenses. At 804, the 3D scanner may characterize outer surface(s) of the inner layer 710 generating a surface characterization file. At 806, the 3D scanner 706, the controller 702, or the 3D printer 708 may correct the shape of the characterization based on a particular predetermined contour of the optical lens (prescription of the lens).

At 808, the 3D scanner 706, the controller 702, or the 3D printer 708 may generate a print model from the corrected characterization. At 810, the 3D printer 708 may overprint the outer layer on the outer surface of the inner layer 710 based on the model with the corrected characterization.

According to some examples, an optical lens may include an inner layer, where the inner layer is a low stress optical lens; and an outer layer that may be formed on at least a portion of an outer surface of the inner layer using a 3D printing technique. The 3D printing technique may include scanning the outer surface of the inner layer; generating a surface characterization file based on the outer surface scan; and printing, using a 3D printer, the one or more corrective layers on the outer surface of the inner layer based on the surface characterization file.

According to some examples, the 3D printing technique may further include correcting the surface characterization file based on a particular predetermined contour of the inner layer and printing, using the 3D printer, the one or more corrective layers on the outer surface of the inner layer based on the corrected surface characterization file. A thickness of the outer layer may be in a range from about 25 micrometers to about 100 micrometers. A thickness of each of the one or more corrective layers may be in a range from less than 1 micrometer to about 10 micrometers. The inner layer and the outer layer may be formed from a polymer or a polycarbonate. The one or more imperfections on the outer surface of the inner layer may include one or more of a peak or a valley. The correction of the surface characterization file may include reduction of root mean square (RMS) values of deviations of detected peaks and valleys on the surface of the inner layer to less than 5 micrometers.

According to some examples, a system may include a 3D scanner to scan an outer surface of an inner layer, where the inner layer includes one or more imperfections on the outer surface of the inner layer; a 3D printer to overprint an outer layer that includes one or more corrective layers on the outer surface of the inner layer based on a corrected model; and a controller. The controller may generate a surface characterization file based on the scan of the outer surface of the inner layer; correct the surface characterization file based on a particular predetermined contour of the inner layer; generate the corrected model from the corrected surface characterization file; and provide the corrected model to the 3D printer.

According to some examples, the system may further include a lens generator to form the inner layer through injection molding, compression molding, or machine casting. The lens generator may form the inner layer with one or more residual stress reduction techniques. The 3D printer may form the outer layer with a thickness in a range from about 25 micrometers to about 100 micrometers. The 3D printer may form each of the one or more corrective layers with a thickness in a range from less than 1 micrometer to about 10 micrometers. The inner layer and the outer layer may be formed from a polymer or a polycarbonate. The one or more imperfections on the outer surface of the inner layer may include one or more of a peak or a valley. The controller may correct the surface characterization file through reduction of root mean square (RMS) values of deviations of detected peaks and valleys on the surface of the inner layer to less than 5 micrometers.

According to some examples, a method of forming a correctively overprinted optical lens may include receiving an inner layer, where the inner layer includes one or more imperfections on an outer surface of the inner layer; scanning an outer surface of an inner layer; generating a surface characterization file based on the scan of the outer surface of the inner layer; correcting the surface characterization file based on a particular predetermined contour of the inner layer; generating a corrected model from the corrected surface characterization file; and overprinting an outer layer with one or more corrective layers on the outer surface of the inner layer based on the corrected model.

According to some examples, the method may further include receiving the inner layer from a lens generator, where the inner layer may be formed by the lens generator through injection molding, compression molding, or machine casting. Correcting the surface characterization file may include reducing root mean square (RMS) values of deviations of detected peaks and valleys on the surface of the inner layer to less than 5 micrometers. Overprinting the outer layer may include forming the outer layer with a thickness in a range from about 25 micrometers to about 100 micrometers. Overprinting the outer layer may include forming each of the one or more corrective layers with a thickness in a range from less than 1 micrometer to about 10 micrometers. The method may further include forming the inner layer and the outer layer from a polymer or a polycarbonate.

Various devices and systems are described herein using example components, configurations, and characteristics. The discussed components, configurations, and characteristics are not intended to be restrictive of example devices and systems. Examples may be implemented with any number of components, configurations, and characteristics using the principles described herein.

In the foregoing description, various inventive examples are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples.

The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

The invention claimed is:

1. An optical lens, comprising:
an inner layer, wherein the inner layer comprises a low stress optical lens; and
an outer layer comprising one or more corrective layers, wherein the outer layer is formed on at least a portion of an outer surface of the inner layer using a three-dimensional (3D) printing technique, wherein:
the outer surface of the inner layer scanned to identify at least one surface imperfection on the outer surface with respect to a particular predetermined contour of the inner layer;
a surface characterization file is generated based on the outer surface scan that includes a correction to the at least one surface imperfection based on the particular predetermined contour of the inner layer; and
the one or more corrective layers are printed, using a 3D printer, on the outer surface of the inner layer to correct the at least one surface imperfection and form the particular predetermined contour based on the correction in the surface characterization file as input to the 3D printer.

2. The optical lens of claim 1, wherein the surface characterization file is corrected via reduction of root mean square (RMS) values of deviations of detected peaks and valleys on the outer surface of the inner layer.

3. The optical lens of claim 2, wherein the reduction of the root mean square (RMS) values is to less than 5 micrometers.

4. The optical lens of claim 1, wherein the outer surface of the inner layer is scanned by a 3D scanner using one or more of visible, infrared, or laser light.

5. The optical lens of claim 1, wherein the outer layer has a thickness in a range from 25 micrometers to 100 micrometers.

6. The optical lens of claim 1, wherein each of the one or more corrective layers has a thickness in a range from less than 1 micrometer to 10 micrometers.

7. The optical lens of claim 1, wherein the 3D printer is an inkjet type 3D printer arranged to provide picoliter size droplets.

8. The optical lens of claim 1, wherein the one or more corrective layers are formed using poly-methyl-methacrylate (PMMA), cyclic-olefin-copolymer (COC), cyclo-olefin-polymer (COP), monomer plastic, polymer plastic, polycarbonate (PC), or optical nylon.

9. A method to form a corrected optical lens, the method comprising:
receiving an inner layer, wherein the inner layer comprises a low stress optical lens; and
forming an outer layer comprising one or more corrective layers on an outer surface of the inner layer by:
scanning the outer surface of the inner layer to identify at least one surface imperfection on the outer surface with respect to a particular predetermined contour of the inner layer;
generating a surface characterization file based on the outer surface scan that includes a correction to the at least one surface imperfection based on the particular predetermined contour of the inner layer; and
forming the one or more corrective layers on the outer surface of the inner layer via three-dimensional (3D) printing to correct the at least one surface imperfection and form the particular predetermined contour based on the correction in the surface characterization file as input to a 3D printer.

10. The method of claim 9, wherein correcting the surface characterization file comprises:

reducing root mean square (RMS) values of deviations of detected peaks and valleys on the outer surface of the inner layer to less than 5 micrometers.

11. The method of claim 9, wherein receiving the inner layer comprises:

receiving an optical lens produced via one or more of casting, injection molding, compression molding, machining, polishing, or a combination thereof.

12. The method of claim 9, wherein scanning the outer surface of the inner layer comprises:

scanning the outer surface of the inner layer by a 3D scanner using one or more of visible, infrared, or laser light.

13. A system to form a corrected optical lens, the system comprising:

a lens generator to provide an inner layer comprising a low stress optical lens;

a three-dimensional (3D) scanner to scan an outer surface of the inner layer to identify at least one surface imperfection on the outer surface with respect to a particular predetermined contour of the inner layer;

a 3D printer to form an outer layer by 3D printing one or more corrective layers on at least a portion of an outer surface of the inner layer to correct the at least one surface imperfection and form the particular predetermined contour; and a controller communicatively coupled to the lens generator, the 3D scanner, and the 3D printer, the controller to:

generate a surface characterization file based on the outer surface scan that includes a correction to the at least one surface imperfection based on the particular predetermined contour of the inner layer; and provide the surface characterization file as input to the 3D printer for printing the one or more corrective layers.

14. The system of claim 13, wherein controller is to correct the surface characterization file via reduction of root mean square (RMS) values of deviations of detected peaks and valleys on the outer surface of the inner layer to less than 5 micrometers.

15. The system of claim 13, wherein the 3D scanner employs one or more of visible, infrared, or laser light.

16. The system of claim 13, wherein:

the outer layer has a thickness in a range from 25 micrometers to 100 micrometers; and each of the one or more corrective layers has a thickness in a range from less than 1 micrometer to 10 micrometers.

17. The system of claim 13, wherein the 3D printer is to print the one or more corrective layers using poly-methyl-methacrylate (PMMA), cyclic-olefin-copolymer (COC), cyclo-olefin-polymer (COP), monomer plastic, polymer plastic, polycarbonate (PC), or optical nylon.

18. The optical lens of claim 1, wherein the one or more corrective layers has a matching refractive index with the inner layer.

19. The method of claim 9, wherein the one or more corrective layers has a matching refractive index with the inner layer.

20. The system of claim 13, wherein the one or more corrective layers has a matching refractive index with the inner layer.

* * * * *